United States Patent Office 3,312,289
Patented Apr. 4, 1967

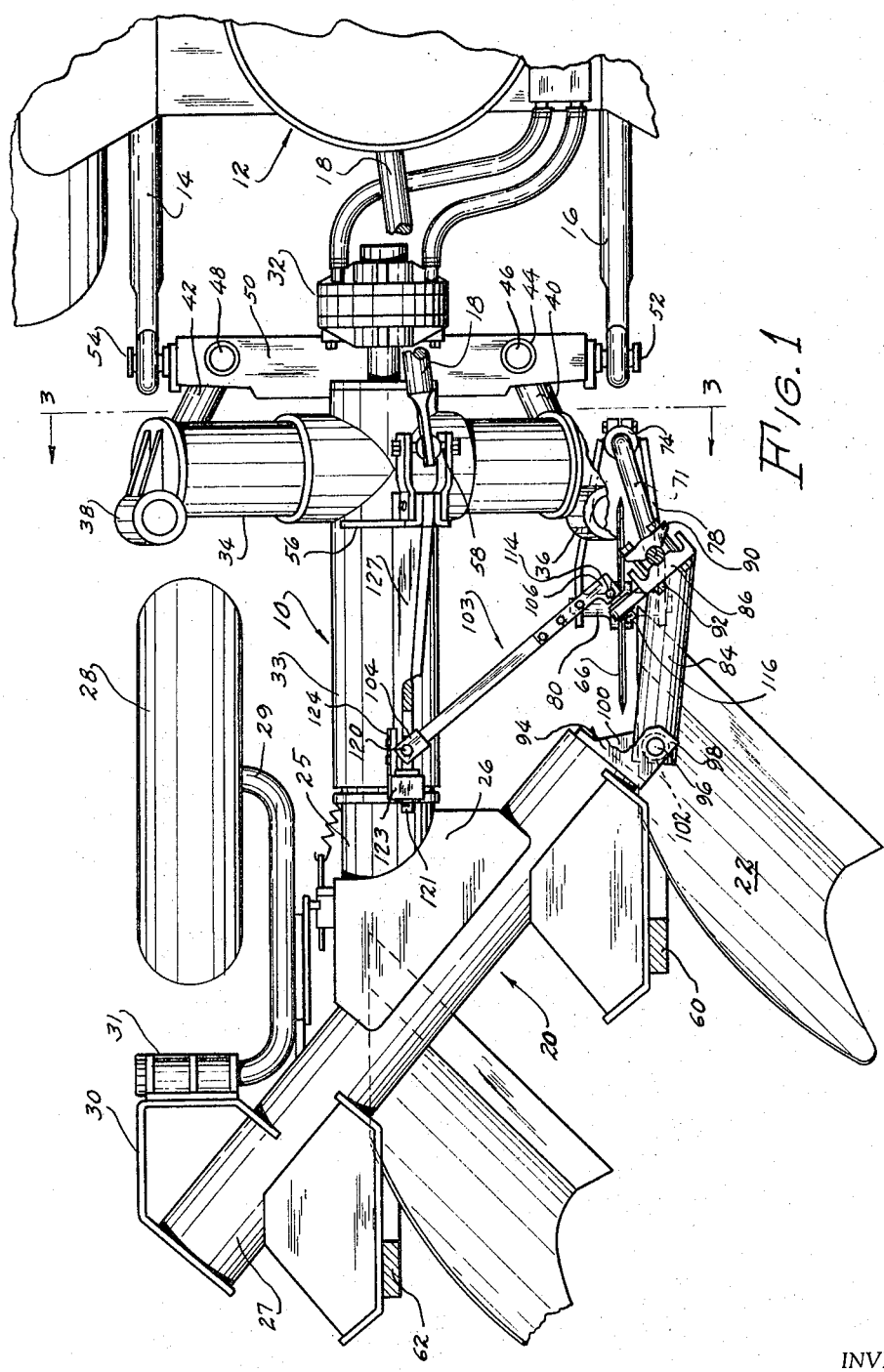

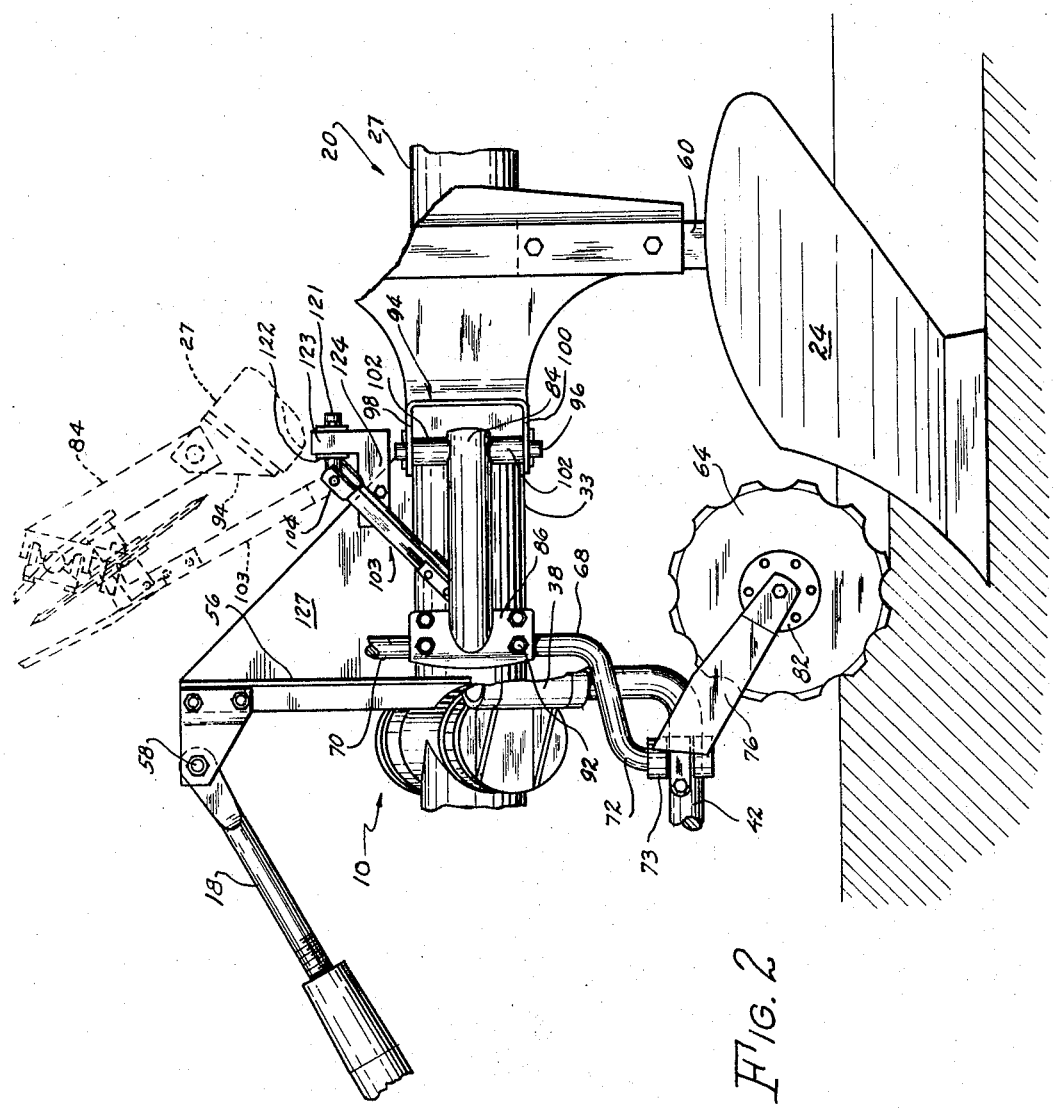

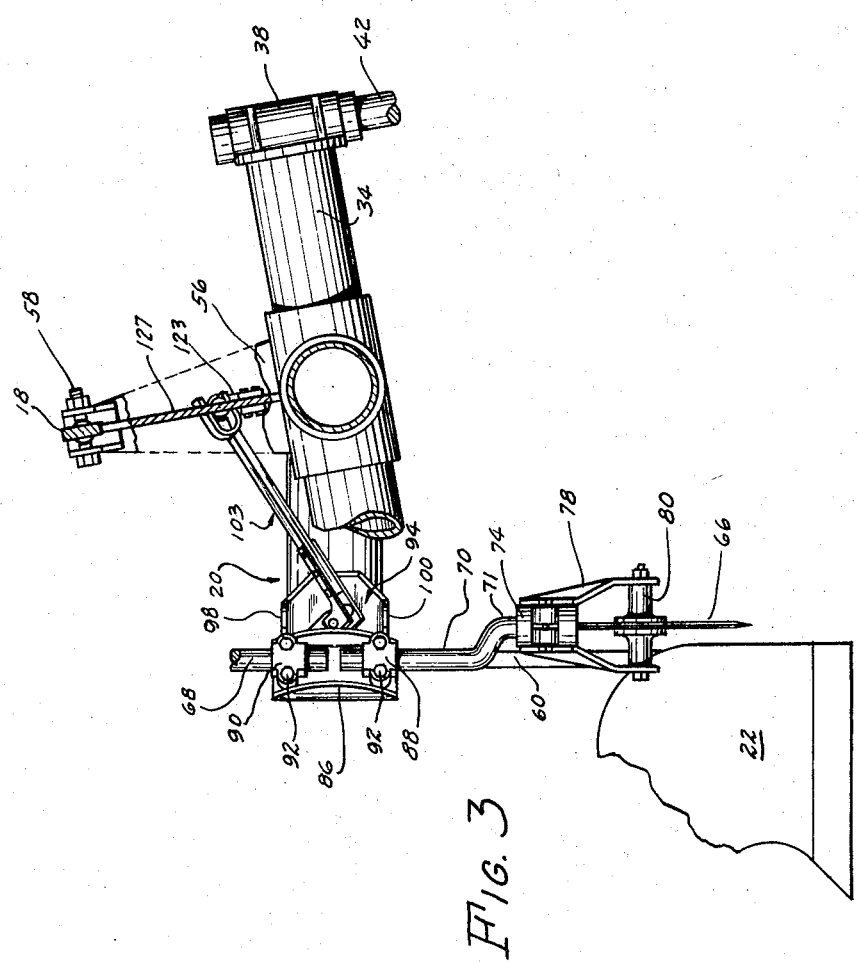

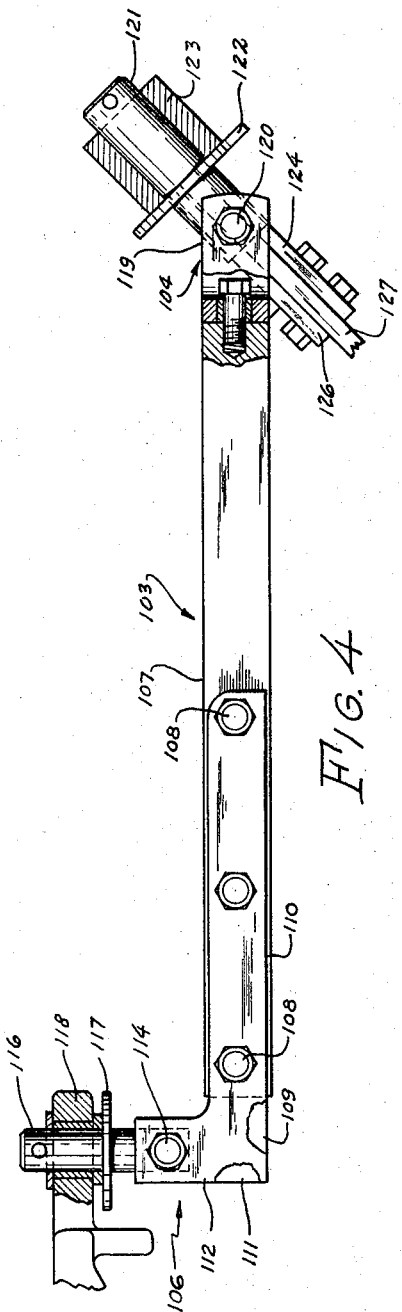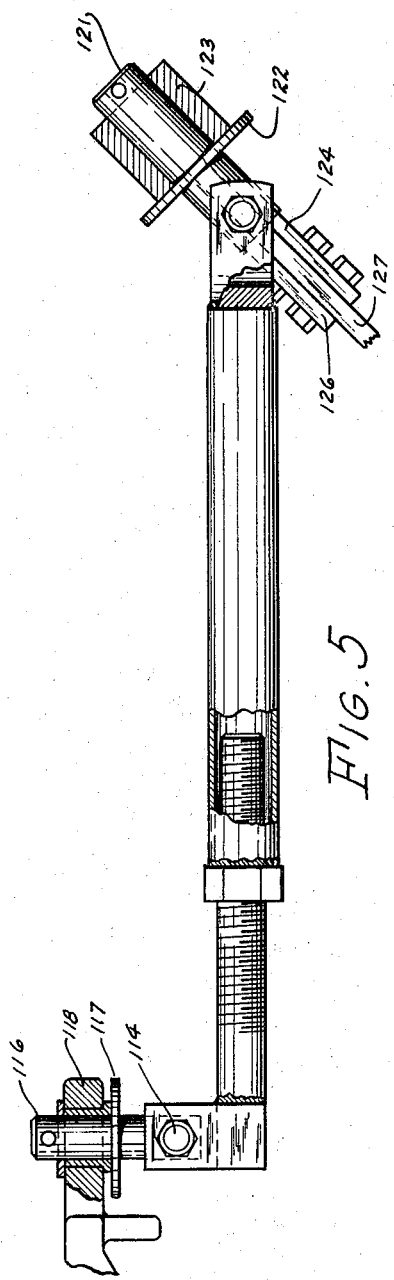

3,312,289
ATTACHMENT FOR TURN-OVER PLOW
Philip D. Wenzel, Rockford, Ill., assignor to J. I. Case Company, Racine, Wis., a corporation of Wisconsin
Filed Oct. 13, 1964, Ser. No. 403,472
8 Claims. (Cl. 172—162)

The present invention relates to coulter attachments for moldboard plows, and particularly to coulter attachments for the turn-over type plows. The turn-over type plow, as is now generally known, includes a stationary plow frame and a turn-over plow frame closely coupled to a tractor. The turn-over frame carries right and left hand moldboards so that one type of moldboard can be used for right hand plowing, and the other type of moldboard can be used for left hand plowing. Rolling coulters or cutters are used to provide an initial break in the soil to allow the trailing moldboard bottoms to more easily turn the soil, and also to leave a smooth edge on the furrow.

In the present state of the art, the space available for the coulter mounting is limited, due to the desirably close coupling of the plow and the tractor. Specifically, the front moldboard either does not have a coulter, or a coulter is mounted on the stationary plow frame in working relation to the front moldboard.

Known arrangements include spaced coulters which are attached to the stationary plow frame and therefore do not turn over with the moldboards.

The present difficulty in mounting coulters on the turn-over frame is that parts of the stationary frame interfere with the coulters as the turn-over frame is rotated for opposite hand plowing.

The present invention provides for mounting or attaching coulters on the turn-over frame without requiring additional space between the tractor and the plow, and the principal object of the invention is to generally improve coulter arrangements and attachments on the turn-over plow, so that each front moldboard has its respective coulter, and a further object is to provide a coulter arrangement which does not require additional space between the tractor and the turn-over plow.

Further objects are to provide a coulter arrangement which does not interfere with any part of the stationary plow frame during the turn-over movement, which has adequate trash clearance, and which can be readily attached to the existing plows.

In the drawings,

FIGURE 1 is a plan view of a part of the top of a turn-over type plow with a coulter arrangement thereon embodying the invention;

FIG. 2 is a fragmentary left side elevation of the same;

FIG. 3 is a fragmentary front elevation of the structure taken at line 3—3 of FIG. 1;

FIG. 4 is an enlarged view of the preferred link assembly;

FIG. 5 is a modification of the link assembly.

As seen in FIGS. 1 and 2, the plow comprises a stationary frame portion generally designated as 10, which is carried on a tractor 12, by hitch arms 14 and 16, and an upper link 18, stationary frame 10 supporting a turn-over frame 20, on which are fixed right hand and left hand moldboard plows 22 and 24.

Turn-over frame 20 comprises a shank portion 25 to which is permanently united as by a reenforcement or bracket 26, a diagonal beam frame member 27. A gage wheel 28 is journaled on an axle 29 and serves to support the turn-over frame and has a bracket 30 fixed thereto, spaced rearwardly from shank 25, to which is secured a turn-over bearing 31. Journaled in bearing 31 is an end portion of above-mentioned axle 29.

When the turn-over frame is to be rotated, a motor 32 does the work, arms 14 and 16 being first swung upwardly by well-known mechanism on the tractor so as to raise the moldboards out of the ground, and as the turn-over frame is rotated, axle 29 changes its position so that wheel 28 rests on the ground and supports the weight of the assemblage.

Above-mentioned wheel 28, through suitable mechanism forming no part of the present invention, is locked in one or the other of two positions for right hand plowing or left hand plowing.

Upon rotation of the turn-over frame, axle 29 shifts from a depending position on one side of shank 25 by swinging of axle 29 in bearing 31, to a depending position on the other side of shank 25 in position for wheel 28 to support the parts with the opposite hand moldboard in the ground at the desired depth, and is latched in position by the above-mentioned well-known mechanism.

Stationary frame 10 includes as a major part of its structure, a sleeve bearing 33 to which is rigidly and permanently united a transverse tubular element 34. Member 34 has at its ends, bearings 36 and 38 having axes which are upwardly directed in the working position of the plow, the bearings having journaled therein links 40 and 42. Links 40 and 42 extend forwardly and inwardly in converging relation to each other, and have enlarged bearing portions as 44, FIG. 1, journaled on pins 46 and 48 which are fixed in a cross bar 50. Cross bar 50 has outwardly extending pintles 52 and 54 which are engaged in well-known manner with above-mentioned hitch arms 14 and 16.

Stationary frame 10 also has an upstanding bracket structure or mast 56 to which is attached by a pin 58, above-mentioned upper link 18. Stationary frame 10 may therefore be propelled or pulled by means of tractor 12 and also lifted and carried on the tractor in the manner well known in connection with the usual three-point hitch.

Turn-over frame 20 comprises essentially above-mentioned diagonal beam frame 27, in the present instance a transverse tubular element to which above-mentioned moldboard plows 22 and 24 are rigidly and ruggedly attached by beams 60 and 62 and appropriate braces.

Member 27 is rigidly fixed by reenforcement 26 in relation to shank element 25 journaled in above-mentioned bearing 33 so that the turn-over frame 20, as a whole, may be turned over along with shank 25, while supported in bearing 33.

The turn-over movement of the plow is initiated and controlled by suitable mechanism, in the instant case by pressurized fluid acting on fluid motor 32, with any suitable or known mechanical connection between the motor and the turn-over frame.

During the turn-over movement, front mounted coulters 64 and 66, of well-known type, being attached to the turn-over frame, turn with it about shank 25 which is supported in bearing 33. Coulters 64 and 66 are carried by coulter standards 68 and 70, having offset or crank portions 71 and 72 carrying, by means of bearing portions 73 and 74, coulter yokes 76 and 78, coulters 64 and 66 being journaled on bearings 80 and 82. The coulter standards are fixedly attached at the ends away from the coulters to a coulter arm 84 between a clamp 86 on coulter arm 84, and the clamp caps 88 and 90 by bolts 92. The coulter clamp 86 is permanently attached to coulter arm 84, which arm is pivotally attached to above-mentioned frame 20 by means of a bracket 94, and a pin 96, bracket 94 being permanently attached to frame 20. Bracket 94 has an upper ear 98 and a lower ear 100 through which pin 96 protrudes. A sleeve 102 extending through arm 84 adjacent to bracket 94 provides a bearing for pin 96.

A desirable feature in the turn-over plow is the provision of a coulter for each moldboard, which coulter revolves with the turn-over frame, and it is also desirable to have the turn-over frame closely coupled to the stationary frame. The coulter arm 84 provides the means for supporting the coulters from the turn-over frame when operating and when going from right hand plowing to left hand plowing, or vice versa. As the plow starts turning from an operating position, the coulters follow a path between the turn-over frame and the stationary frame. This path is not necessarily clear of all parts on the stationary frame, and to avoid conflict of the coulter parts with parts of the stationary frame, coulter arm 84 may be swung by mechanism, which will be described below, in the present instance rearwardly, out of a path which would conflict with any part of the stationary frame. The path of the coulters and coulter standards is shown dotted in the mid turn-over position in FIG. 2. In order to swing arm 84, an adjustable link assembly 103 is used to move the coulters in a rearward direction in the travel from one operating position to the other operating position. The adjustable link assembly provides the means for controlling the position and travel of the coulters. The link assembly 103, shown in FIG. 4, includes a connection between the stationary frame 10 and the outer portion of arm 84 by means of a universal type joint 106, and a universal connection 104 located generally upwardly of shank 25; a notched link element 107 to which is attached by means of pins 108, notched link levers 109 and 110 forming the above-mentioned link assembly 103. Link levers 109 and 110 have offset clevis type connections 111 and 112 through which a first pin 114 makes connection to a second pin 116, said second pin 116 incorporating a shoulder 117 to fit against an ear portion 118 of clamp 86.

Link element 107 has a clevis type connection 119 through which a first pin 120 makes connection to a second pin 121, said second pin 121 incorporating a shoulder 122 to fit against a block 123 to which are permanently united two plates 124 and 126 for attaching to a point on a reenforcing plate 127 constituting part of mast structure 56 on the stationary frame.

The operation of the device will be apparent from the foregoing, by way of summarizing, it has been impractical in the past to provide coulters for the front bottoms of turn-over plows, which turn over with the plows while still maintaining a desirably limited spacing between the plow and the tractor. This is because of the likelihood of conflict between the coulter parts and the relatively stationary parts of the plow. In the present construction, coulter arm 84 and adjustable link assembly 103 support and hold the coulters in the proper position for operation on first one side of the plow and then the other. When operating in either the right hand or left hand position, the adjustable link assembly is extended in a downward, forward, and sideways direction from a point on the stationary frame, said point being displaced a certain distance upwardly from the center line of the stationary frame about which the turn-over frame rotates. During the turn-over movement, the coulter arm is swung in a rearward path to clear the stationary parts of the plow, said movement causing the coulters to be raised out of the ground on one side of the turn-over bearing, pulled in an upward and rearward direction, as shown dotted in FIG. 2, held in this path as the movement continues past the stationary frame, pushed in a downward and forward direction and lowered to the operating position on the opposite side. The positions of the universal joints are located to obtain the necessary clearance during the turn-over movement.

Variations will doubtless occur to those skilled in the art, as for example, the possibility of using coulter standards for sliding movement. FIG. 5 shows a tubular element or pipe to which is permanently united a threaded unit forming with a rod engaged in the threaded unit, an adjustable assembly. This adjustable assembly may be a modification or alternate means of accomplishing a similar result. Ball joints might be substituted for the universal joints shown, and it is to be understood that all such variations are to be considered as part of the invention, and that the same is not to be taken as limited by anything in the description or drawings, or in fact in any manner, except as defined in the annexed claims.

What is claimed as new and desired to be secured by Letters Patent of the United States is:

1. In a combination tractor and turn-over plow, having a stationary plow frame and a turn-over frame, coulters and coulter standards
   shiftably carried by the turn-over frame,
   means connected to said coulter standards and to said stationary plow frame, said means shifting said coulters and coulter standards during turn-over movement from a right hand operating position,
   through a rearward position to a left hand operating position.

2. A two-way plow including a relatively
   stationary frame and a
   turn-over frame and having a
   right-hand bottom and a
   left-hand bottom, said bottoms being swingable by rotation of said turn-over frame into operative and inoperative positions, a
   coulter positioned forwardly of each of said plow bottoms and swingable by rotation of said turn-over frame into operative and inoperative positions in relation to its respective plow bottom, said coulters being
   shiftably supported from said turn-over frame, and
   means positioned to
   shift said coulters rearwardly during swinging movement of said bottoms and coulters.

3. A two-way plow including a relatively
   stationary frame and a
   turn-over frame rotatably supported from the stationary frame and having a
   right-hand bottom and a
   left-hand bottom, said bottoms being swingable by rotation of said turn-over frame into operative and inoperative positions, a
   coulter positioned forwardly of each of said plow bottoms and swingable by rotation of said turn-over frame into operative and inoperative positions in relation to its respective plow bottom, said coulters being
   shiftably supported from said turn-over frame, and
   means positioned to
   shift said coulters rearwardly during swinging movement of said bottoms and coulters in a path to avoid contact with any part of said stationary frame.

4. A two-way plow including a relatively
   stationary frame and a
   turn-over frame rotatably supported from the stationary frame and having a
   right-hand bottom and a
   left-hand bottom, said bottoms being swingable by rotation of said turn-over frame into operative and inoperative positions, a
   coulter positioned forwardly of each of said plow bottoms and swingable by rotation of said turn-over frame into operative and inoperative positions in relation to its respective plow bottom, said coulters being
   shiftably supported from said turn-over frame, and
   means connected with said coulters and with said stationary frame and positioned to
   shift said coulters rearwardly during swinging movement of said bottoms and coulters in a path to avoid contact with any part of said stationary frame.

5. A coulter mounting for use in a combination tractor and turn-over plow of the type having a three-point hitch for reception of implements, a stationary plow frame mounted on said three-point hitch, a mast on said stationary plow frame, a turn-over frame mounted on said stationary plow frame for rotary movement and having a main beam, coulter standards carried by the turn-over frame, coulters on said coulter standards, and a plurality of moldboard plows on said turn-over frame, said coulter mounting comprising said coulters and coulter standards, said standards being shiftable in relation to the turn-over frame, a coulter arm pivotally attached at one end to said main beam and a clamp support at the other end of said arm for supporting said coulter standards, a link assembly pivotally attached at one end to said stationary plow frame and pivotally attached at its other end to said coulter arm for shifting said coulter arm, coulters and coulter standards by reason of turning of the turn-over frame from right-hand operating position to left-hand operating position, said link assembly being positioned for shifting said coulter and coulter standards during turn-over movement from right-hand operating position through a rearward position to a left-hand operating position.

6. A coulter mounting for use in a combination tractor and turn-over plow of the type having a three-point hitch for reception of implements, a stationary plow frame mounted on said three-point hitch, a mast on said stationary plow frame, a turn-over frame mounted on said stationary plow frame for rotary movement and having a main beam, coulter standards carried by the turn-over frame, coulters on said coulter standards, and a plurality of moldboard plows on said turn-over frame, said coulter mounting comprising said coulters and coulter standards, said standards being shiftable in relation to the turn-over frame, a coulter arm pivotally attached at one end to said main beam and a clamp support at the other end of said arm for supporting said coulter standards, a link assembly, adjustable in length, pivotally attached at one end to said stationary plow frame and pivotally attached at its other end to said coulter arm for shifting said coulter arm, coulters and coulter standards by reason of turning of the turn-over frame from right-hand operating position to left-hand operating position, said link assembly being positioned for shift said coulter and coulter standards during turn-over movement from right-hand operating position through a rearward position to a left-hand operating position.

7. A coulter mounting for use in a combination tractor and turn-over plow of the type having a three-point hitch for reception of implements, a stationary plow frame mounted on said three-point hitch, a mast on said stationary plow frame, a turn-over frame mounted on said stationary plow frame for rotary movement and having a main beam, coulter standards carried by the turn-over frame, coulters on said coulter standards, and a plurality of moldboard plows on said turn-over frame, said coulter mounting comprising said coulters and coulter standards, said standards being shiftable in relation to the turn-over frame, a bracket attached to the main beam, a coulter arm pivotally attached at one end to said bracket and a clamp support at the other end of said arm for supporting said coulter standards, a link assembly pivotally attached at one end to said stationary plow frame and pivotally attached at its other end to said coulter arm for shifting said coulter arm, coulters and coulter standards by reason of turning of the turnover frame from right-hand operating position to left-hand operating position, said link assembly being positioned for shifting said coulter and coulter standards during turn-over movement from right-hand operating position through a rearward position to a left-hand operating position.

8. A coulter mounting for use in a combination tractor and turn-over plow of the type having a three-point hitch for reception of implements, a stationary plow frame mounted on said three-point hitch, a mast on said stationary plow frame, a turn-over frame mounted on said stationary plow frame for rotary movement and having a main beam, coulter standards carried by the turn-over frame, coulters on said coulter standards, and a plurality of moldboard plows on said turn-over frame, said coulter mounting comprising said coulters and coulter standards, said standards being shiftable in relation to the turn-over frame, a bracket attached to the main beam, a coulter arm pivotally attached at one end to said bracket and a clamp support at the other end of said arm for supporting said coulter standards, a link assembly, adjustable in length, pivotally attached at one end to said stationary plow frame and pivotally attached at its other end to said coulter arm for shifting said coulter arm, coulters and coulter standards by reason of turning of the turn-over frame from right-hand operating position to left-hand operating position, said link assembly being positioned for shifting said coulter and coulter standards during turn-over movement from right-hand operating position through a rearward position, to avoid contact with said mast of said stationary plow frame, to a left-hand operating position.

References Cited by the Examiner

FOREIGN PATENTS 730,001   5/1955   Great Britain.

ABRAHAM G. STONE, *Primary Examiner.*

J. R. OAKS, *Assistant Examiner.*